United States Patent
Menchetti

(10) Patent No.: US 11,774,785 B2
(45) Date of Patent: Oct. 3, 2023

(54) OPTICAL LIMITER AND METHOD FOR LIMITING RADIANT FLUX

(71) Applicant: BRITISH TELECOMMUNICATIONS PUBLIC LIMITED COMPANY, London (GB)

(72) Inventor: Marco Menchetti, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/995,165

(22) PCT Filed: Mar. 10, 2021

(86) PCT No.: PCT/EP2021/056074
§ 371 (c)(1),
(2) Date: Sep. 30, 2022

(87) PCT Pub. No.: WO2021/197780
PCT Pub. Date: Oct. 7, 2021

(65) Prior Publication Data
US 2023/0140182 A1     May 4, 2023

(30) Foreign Application Priority Data

Mar. 30, 2020 (EP) .................................. 20166647
Mar. 30, 2020 (GB) .................................. 2004584

(51) Int. Cl.
*G02F 1/01* (2006.01)
*G02B 6/35* (2006.01)
*G02B 26/02* (2006.01)

(52) U.S. Cl.
CPC .......... *G02F 1/0126* (2013.01); *G02B 6/3512* (2013.01); *G02B 26/023* (2013.01); *G02F 1/0147* (2013.01)

(58) Field of Classification Search
CPC ... G02F 1/0126; G02F 1/0147; G02B 6/3512; G02B 26/023
See application file for complete search history.

(56) References Cited

U.S. PATENT DOCUMENTS 3,734,592 A    5/1973  Sztankay et al.
5,491,579 A    2/1996  Justus et al.
(Continued)

FOREIGN PATENT DOCUMENTS

EP    0902311 A2    3/1999
EP    1467239 A2    10/2004
(Continued)

OTHER PUBLICATIONS

Casaleiro J., et al., "On the Feasibility of GPON Fiber Light Energy Harvesting for the Internet of Things," ISEL Academic Journal of Electronics, Telecommunications and Computers IoT-2018 Issue, vol. 4, n. 1 (2018) ID-9, 11 pages.
(Continued)

*Primary Examiner* — Leslie C Pascal
(74) *Attorney, Agent, or Firm* — PATTERSON THUENTE, P.A.

(57) ABSTRACT

This disclosure relates to an optical limiter for limiting the radiant flux of an optical source beam, including an optical control port for illumination by an optical control beam originating from the source beam; an optical input port for illumination by an optical transmission beam originating from the source beam; an optical output port for illumination by the transmission beam; and a thermally driven light mill; wherein the light mill is arranged with respect to the input port, the control port and the output port such that: illumination of the control port by the control beam drives the light mill to rotate only when the control beam has a radiant flux equal to or in excess of a predetermined radiant flux threshold; and rotation of the light mill causes an area of the output port illuminated by the transmission beam to change.

15 Claims, 6 Drawing Sheets

(56) References Cited

U.S. PATENT DOCUMENTS

| | | | |
|---|---|---|---|
| 5,796,523 | A | 8/1998 | Hall |
| 6,218,658 | B1 | 4/2001 | Taneda et al. |
| 6,256,430 | B1 | 7/2001 | Jin et al. |
| 6,404,727 | B1 | 6/2002 | Rao |
| 6,415,075 | B1 | 7/2002 | DeRosa et al. |
| 6,549,692 | B1 | 4/2003 | Harel et al. |
| 6,711,319 | B2 | 3/2004 | Hoen |
| 6,760,506 | B2 | 7/2004 | Laor |
| 6,787,745 | B2 | 9/2004 | Hajjar et al. |
| 6,795,603 | B2 | 9/2004 | Utsunomiya |
| 6,829,079 | B2 | 12/2004 | Oda et al. |
| 6,965,710 | B2 | 11/2005 | Makio |
| 9,354,483 | B2 | 5/2016 | Izumi |
| 2009/0207478 | A1 | 8/2009 | Oron et al. |
| 2010/0166368 | A1 | 7/2010 | Oron et al. |
| 2011/0305413 | A1 | 12/2011 | Heidrich et al. |

FOREIGN PATENT DOCUMENTS

| | | | |
|---|---|---|---|
| EP | 1724624 | A1 | 11/2006 |
| EP | 2684084 | A1 | 1/2014 |
| WO | WO-9944841 | A1 | 9/1999 |
| WO | WO-2009156816 | A1 | 12/2009 |
| WO | WO-2019133101 | A2 | 7/2019 |

OTHER PUBLICATIONS

Combined Search and Examination Report under Sections 17 and 18(3) for Great Britain Application No. 2004580.3, dated Sep. 21, 2020, 5 pages.

Combined Search and Examination Report under Sections 17 and 18(3) for Great Britain Application No. 2004584.5, dated Sep. 21, 2020, 5 pages.

Examination Report under section 18(3) for GB Application No. GB2004580.3, dated Jan. 19, 2022, 3 pages.

Examination Report under section 18(3) for GB Application No. GB2004580.3, dated Mar. 23, 2022, 3 pages.

Examination Report under section 18(3) for GB Application No. GB2004584.5, dated Jan. 19, 2022, 4 pages.

Extended European Search Report for Application No. 20166643.5 dated Sep. 28, 2020, 6 pages.

Extended European Search Report for Application No. 20166647.6 dated Aug. 26, 2020, 7 pages.

Gauthier R.C., et al., "Activation of Microcomponents With Light for Micro-Electro-Mechanical Systems and Micro-Optical-Electro-Mechanical Systems Applications," Applied Optics, Apr. 20, 2002, pp. 2361-2367.

Han L., et al., Light-Powered Micromotor: Design, Fabrication, and Mathematical Modeling, Journal of Microelectromechanical Systems, vol. 20, No. 2, Apr. 2011, pp. 487-496.

International Search Report and Written Opinion for Application No. PCT/EP2021/056069, dated May 27, 2021, 11 pages.

International Search Report and Written Opinion for Application No. PCT/EP2021/056074, dated Apr. 14, 2021, 12 pages.

Lin L.Y., et al., "Free-Space Micromachined Optical Switches With Submillisecond Switching Time for Large-Scale Optical Cross Connects," IEEE Photonics Technology Letters, vol. 10, No. 4, Apr. 1998, pp. 525-527.

Makri E., et al., "Concept of a Reflective Power Limiter Based on Nonlinear Localized Modes," Feb. 2014, Physical Review A, Atomic, molecular, and optical physics, vol. 89(3), 6 pages.

Shakeel M.N., et al., "Optical Switches," 17 pages.

Toshiyoshi H., et al., "Electrostatic Micro Torsion Mirrors for an Optical Switch Matrix," Journal of Microelectromechanical Systems, vol. 5, No. 4, Dec. 1996, pp. 231-237.

Wolfe D., et al., "A Horizontal Vane Radiometer: Experiment, Theory, and Simulation," 26 pages.

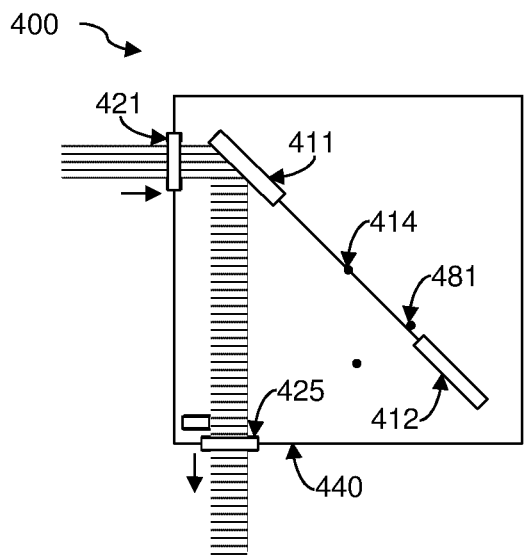 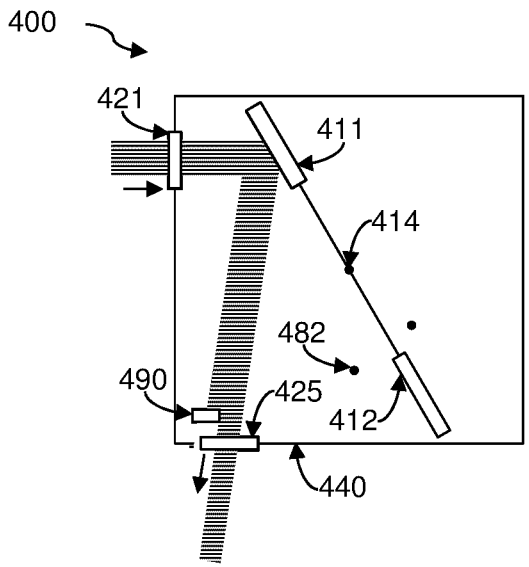
Figure 4A  Figure 4B
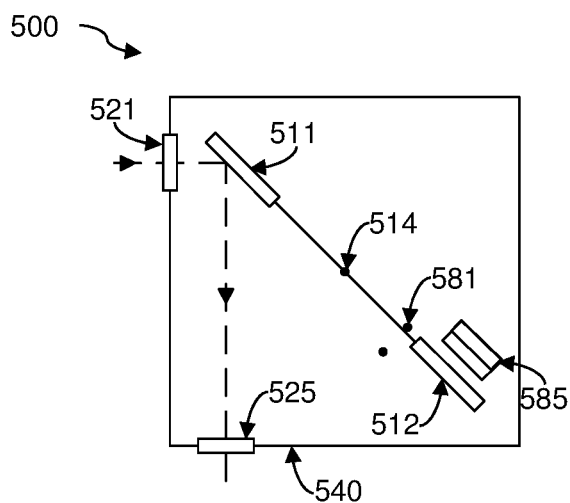 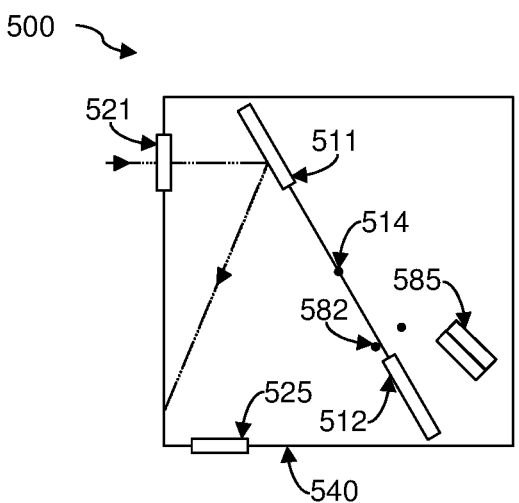
Figure 5A  Figure 5B

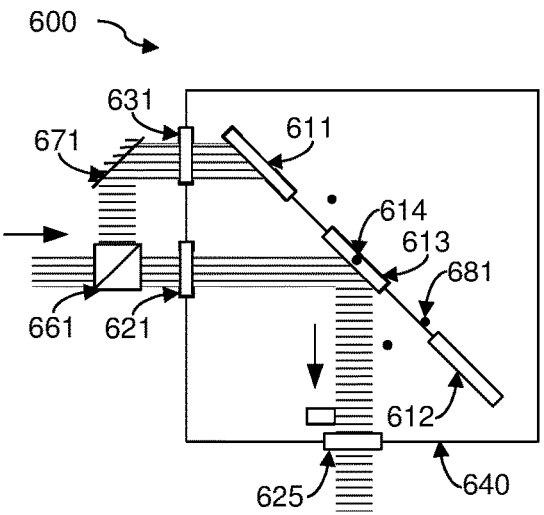 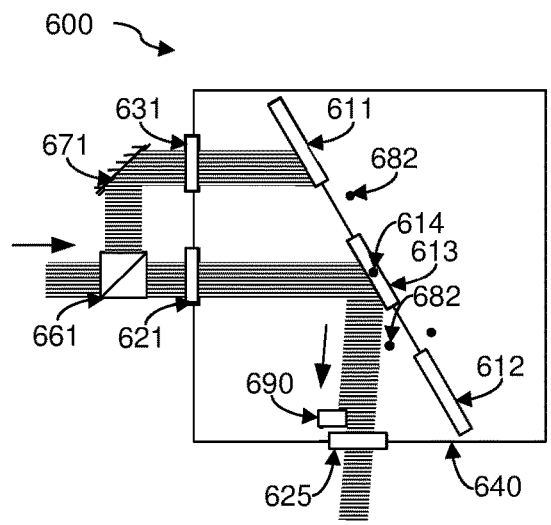
Figure 6A　　　　　　　　Figure 6B
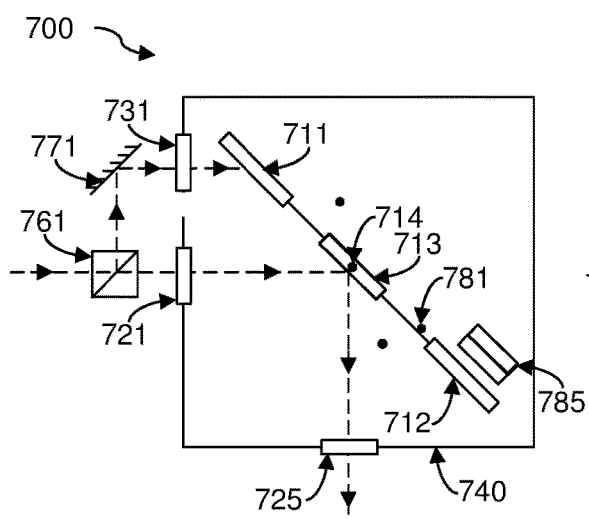 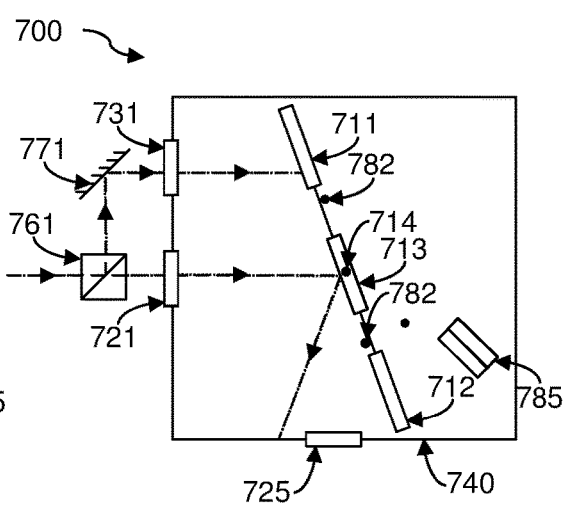
Figure 7A　　　　　　　　Figure 7B

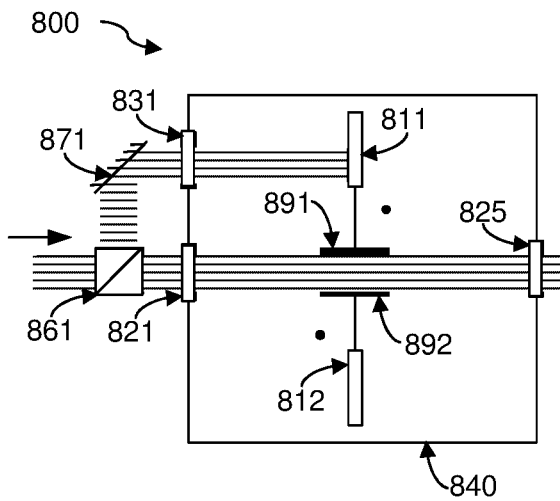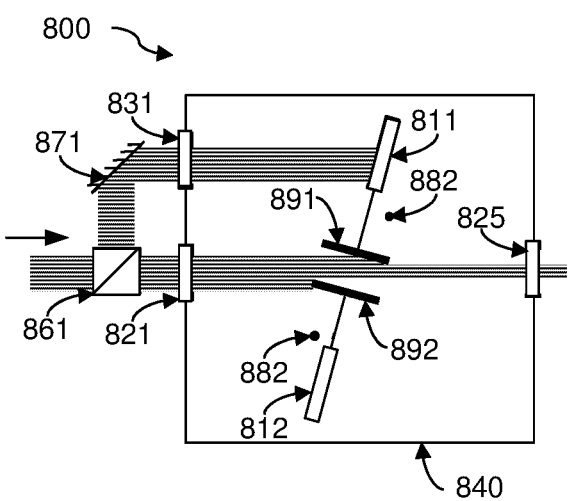
Figure 8A
Figure 8B
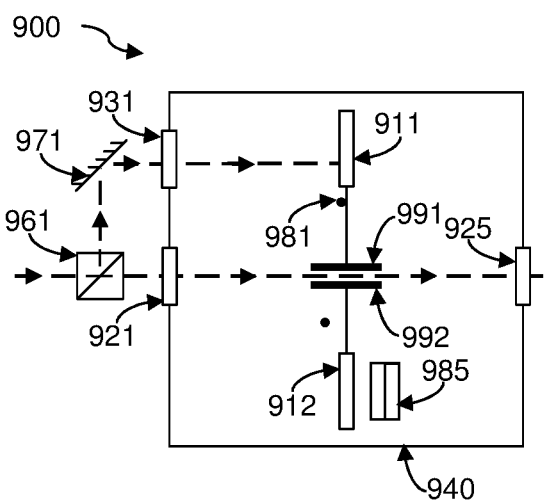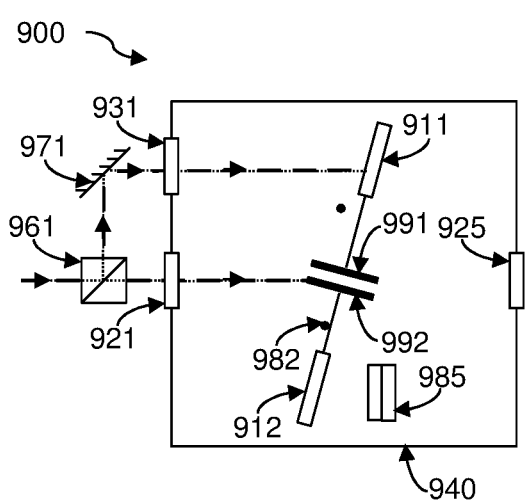
Figure 9A
Figure 9B

OPTICAL LIMITER AND METHOD FOR LIMITING RADIANT FLUX

PRIORITY CLAIM

The present application is a National Phase entry of PCT Application No. PCT/EP2021/056074, filed Mar. 10, 2021, which claims priority from EP Patent Application No. 20166647.6, filed Mar. 30, 2020 and GB Patent Application No. 2004584.5, filed Mar. 30, 2020, each of which is hereby fully incorporated herein by reference.

FIELD

The present vapor disclosure relates to limiting the radiant flux of an optical beam; that is, limiting the radiant energy transmitted by the beam per unit time—its power. More specifically, aspects relate to an optical limiter and a method for limiting the radiant flux of an optical source beam.

BACKGROUND

Optical networks are used to communicate data, encoded in optical signals, over fiber optic cables. To ensure optical signals are successfully transmitted from a source to a destination, without damage to any network components, it can be necessary to limit the radiant flux of optical beams carrying optical signals. This can be achieved using optical limiters.

Optical limiters are devices intended to limit the radiant flux of an optical beam to no more than a predetermined maximum. An idealized graph of input radiant flux versus output radiant flux for a flat maximum optical limiter is shown in FIG. 1A1, wherein the output rises proportional to the input until a maximum output value M is reached, at which point the output is maintained at that level M no matter how much more the input rises.

Optical limiters can for example be formed using materials having negative thermal index coefficients, wherein heat generated by absorption of an optical beam decreases the index of refraction of the material, causing light rays to fan out in a defocused pattern such that only some of these light rays are received by a collimating lens. Other kinds of optical limiters make use of stabilized optical amplifiers whose outputs are kept constant by feedback loops, or which present saturation at their inputs.

Optical fuses are a particular kind of optical limiter intended to interrupt the passage of an optical beam if its radiant flux exceeds a predetermined maximum. A graph of input radiant flux versus output radiant flux for an idealized optical fuse is shown in FIG. 1A2, wherein the output rises proportional to the input until a maximum output value M is reached, at which point the output falls to zero and remains zero for all higher input values.

Optical fuses can for example be constructed using light absorbing materials which are either destroyed by the heat generated when a powerful optical beam is incident on them, or whose transmittivity is changed by that heat (e.g. so that they become opaque). Optical fuses are therefore generally single use; they must be replaced to re-establish an optical connection along the path they reside in.

What is needed is an alternative optical limiter which is reusable and does not require the use of exotic materials.

SUMMARY

According to a first aspect, there is provided an optical limiter for limiting the radiant flux of an optical source beam, the limiter comprising: an optical control port for illumination by an optical control beam originating from the source beam; an optical input port for illumination by an optical transmission beam originating from the source beam; an optical output port for illumination by the transmission beam; and a thermally driven light mill; wherein the light mill is arranged with respect to the input port, the control port and the output port such that: illumination of the control port by the control beam drives the light mill to rotate only when the control beam has a radiant flux equal to or in excess of a predetermined radiant flux threshold; and rotation of the light mill causes an area of the output port illuminated by the transmission beam to change.

The light mill comprises: an axle; and at least one vane: arranged to rotate about the axle's axis in an environment comprising fluid, and having a first side and a second side which are thermally insulated from one another such that the light mill is driven by illumination of the first side by the control beam so that the first side absorbs more light energy than the second side, establishing a temperature gradient from the second side to the first side so that the vane rotates about the axle's axis with the first side trailing.

The predetermined radiant flux threshold depends on the light mill's inertia.

The limiter can be configured to permit rotation of the light mill by an angle large enough that the area of the output port illuminated by the transmission beam is zero, such that the limiter acts as a reusable optical fuse.

The source beam can originate from a laser.

A side of a vane of the light mill arranged to be illuminated by the control beam can have a higher optical absorptance than an opposing side of that vane.

Alternatively or additionally, a side of a vane of the light mill arranged to be illuminated by the control beam and an opposing side of that vane can be shaped such that, over a permitted range of rotation of the light mill, the side of the vane illuminated by the control beam receives a greater quantity of radiant energy from the control beam than the opposing side.

The limiter can further comprise an optical baffle apparatus arranged to prevent a portion of the transmission beam from illuminating the output port, that portion's size being dependent on an angle by which the light mill is rotated.

The baffle apparatus can comprise: one or more light directors; and/or one or more beam stoppers.

The input port and the output port can be coaxial with one another; the baffle apparatus can comprise one or more beam stoppers arranged to rotate with the light mill; and said one or more beam stoppers can be arranged to define an aperture that the transmission beam must pass through to reach the output port.

The aperture can be coaxial with the input and output ports when the angle is zero.

The input port can be the control port, the source beam itself serving as both the transmission beam and the control beam.

The limiter can further comprise an optical splitter arranged to split the source beam into the transmission beam and the control beam.

The limiter can further comprise a biasing element; wherein the light mill is coupled to the biasing element such that the light mill is biased towards a first rotational position in which the area of the output port illuminated by the transmission beam is maximized relative to any other rotational position of the light mill.

The biasing element can be configured to be adjustable so that a biasing force it exerts on the light mill can be modified.

The biasing element can be configured to: when the radiant flux of the source beam is below the predetermined threshold, prevent rotation of the light mill away from the first rotational position; and when the radiant flux of the source beam equals or exceeds the predetermined threshold, permit rotation of the light mill from the first rotational position by the angle large enough that the area of the output port illuminated by the transmission beam is zero.

The limiter can further comprise one or more stays, each arranged to prevent rotation of the light mill beyond a particular rotational position.

The limiter can further comprise a housing which encloses the light mill, the housing comprising an aperture configured for partial evacuation of fluid surrounding the light mill.

According to a second aspect, there is provided a method of limiting the radiant flux of an optical source beam, the method comprising: illuminating the input port of the optical limiter of any preceding claim with an optical transmission beam originating from the source beam; and illuminating the control port of the optical limiter of any preceding claim with an optical control beam originating from the source beam.

BRIEF DESCRIPTION OF THE FIGURES

Aspects of the present disclosure will now be described by way of example with reference to the accompanying figures. In the figures:

FIG. 1A1 is an idealized graph of input radiant flux versus output radiant flux for a flat maximum optical limiter.

FIG. 1A2 is a graph of input radiant flux versus output radiant flux for an idealized optical fuse.

FIG. 1B1 illustrates a Crookes radiometer light mill.

FIG. 1B2 illustrates forces on each vane of the Crookes radiometer of FIG. 1B1.

FIG. 4A illustrates another example optical limiter in a first position.

FIG. 4B illustrates the limiter of FIG. 4A in a second position.

FIG. 5A illustrates another example optical fuse in an "on" position.

FIG. 5B illustrates the fuse of FIG. 5A in an "off" position.

FIG. 6A illustrates another example optical limiter in a first position.

FIG. 6B illustrates the limiter of FIG. 6A in a second position.

FIG. 7A illustrates another example optical fuse in an "on" position.

FIG. 7B illustrates the fuse of FIG. 7A in an "off" position.

FIG. 8A illustrates another example optical limiter in a first position.

FIG. 8B illustrates the limiter of FIG. 8A in a second position.

FIG. 9A illustrates another example optical fuse in an "on" position.

FIG. 9B illustrates the fuse of FIG. 9A in an "off" position.

DETAILED DESCRIPTION OF THE FIGURES

Figure 1C:
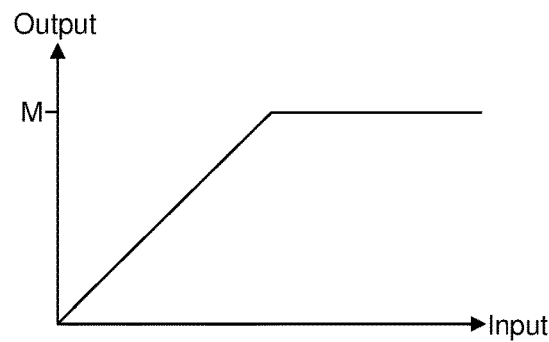
FIG. 1C illustrates another design of light mill.
Figure 1C:
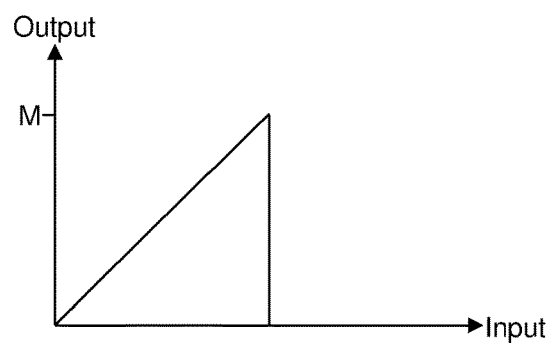
Figure 1C:
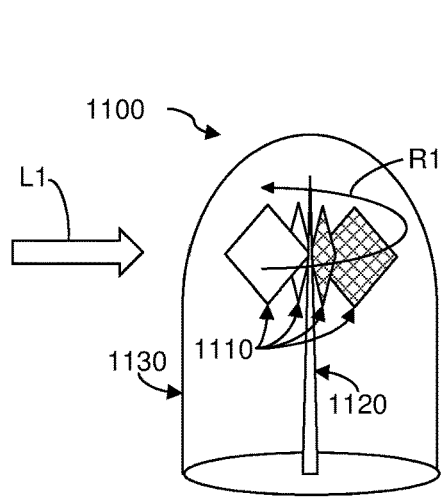
Figure 1C:
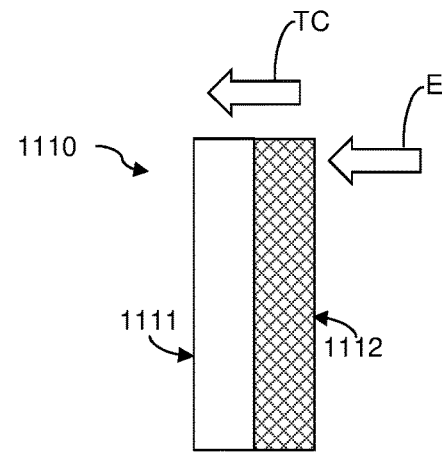
Figure 1C:
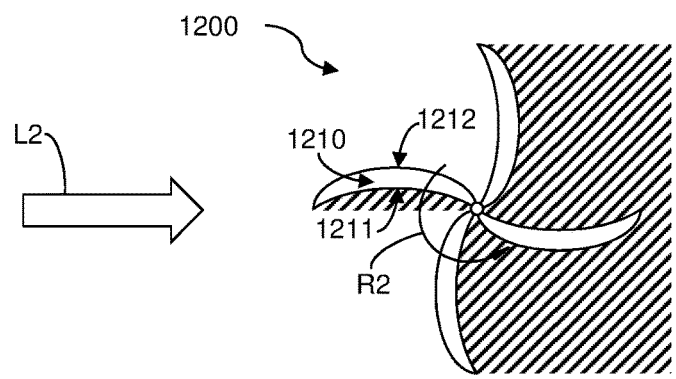

The following description is presented to enable any person skilled in the art to make and use the system and is provided in the context of a particular application. Various modifications to the disclosed embodiments will be readily apparent to those skilled in the art.

The terms "top", "bottom", "side", "front", "back", "forward", "rear", "clockwise", "anticlockwise" and other terms describing the orientation of features are not intended to be limiting and, where used, are purely included in order to facilitate the description of the relative location of these features in the context of the accompanying drawings. In use, or during storage, the features may be disposed in other orientations.

It is proposed to use the light mill effect to route an optical signal between an input and an output of an optical limiter in such a way that the radiant flux of an output beam carrying the signal is limited to no more than a predetermined maximum.

A thermally driven light mill comprises at least one vane/blade whose two sides are thermally insulated from one another so that when one side is heated by light or other electromagnetic radiation it remains hotter than the other side. The vanes are located in fluid (typically low-pressure air) such that convection currents set up in the fluid by the asymmetry in temperature between the two sides of each vane are sufficient to cause the light mill to rotate.

In order to start a stationary light mill rotating the light mill effect (and therefore the radiant flux of the light source causing it) must be sufficient to overcome the light mill's inertia. In order to keep the light mill rotating, the light mill effect (and therefore the radiant flux of the light source causing it) must be sufficient to overcome frictional forces acting on the light mill during rotation, with respect to its mounting(s) and the surrounding fluid.

Optionally, the two sides of each vane can have different electromagnetic absorption characteristics so as to increase the rate at which the temperature differential is established and/or allow the temperature differential to become established in circumstances where both sides of the vane are exposed to the radiation.

FIG. 1B1 illustrates a Crookes radiometer 1100, the classical demonstration of the light mill effect. The Crookes radiometer 1100 comprises four vanes 1110 arranged to rotate around an axle 1120 within a partially evacuated jar 1130. Each vane 1110 is painted white on one side and black on the other, with the vanes arranged so that black and white sides alternate around the radiometer. (The black sides are indicated by cross-hatching.) When light is shone on the radiometer 1100 from the direction indicated by the arrow L1, the vanes rotate about the axle 1120 in the direction indicated by the arrow R1, i.e. with the black sides trailing.

FIG. 1B2 illustrates forces on each vane 1110 of the Crookes radiometer 1100 of FIG. 1B1. In FIG. 1B2 a vane 1110 is shown side-on, with its white side 1111 to the left and its black side 1112 to the right. The white side 1111 and the black side 1112 are thermally insulated from one another. The black side 1112 absorbs more light energy than the white side 1111. A temperature gradient is therefore established from the white side 1111 to the black side 1112 (left to right in FIG. 1B2). This sets up convection currents in the thin air surrounding the vane, resulting in unbalanced forces on the vane. A "thermal creep" force TC acts in a direction opposite to the temperature gradient. An additional "Einstein effect" force E acts on the edges of the surfaces which lie perpendicular to the temperature gradient, again in a direction opposite to the temperature gradient. The forces TC and E therefore cause the vane 1110 to rotate about the axle 1120 with the black side 1112 trailing.

Hettner radiometers are similar to Crookes radiometers but with horizontal (as opposed to vertical) vanes, the exposed face of each vane being painted half black and half white, the black and white sides alternating around the radiometer. The Einstein effect is not present in a Hettner radiometer, but it still rotates with the black sides of the vanes trailing due to the thermal creep force.

FIG. 1C is a plan view illustrating another design of light mill 1200 where a difference in light absorption between the two sides of each vane 1210 results from their geometry, not their color. The vanes 1210 are shaped so that they each have a concave side 1211 and a convex side 1212, the convex and concave faces alternating around the radiometer. The shading in FIG. 1C illustrates where shadow falls when light is shone on the light mill 1200 from the direction indicated by the arrow L2. It can be seen that, over the course of a full rotation, the convex sides 1212 of the vanes 1210 receive more light energy than the concave sides 1211. This establishes a temperature gradient from the concave side 1211 to the convex side 1212 of each vane 1210, so that the thermal creep force and the Einstein effect cause the vanes 1210 to rotate about the axle in the direction indicated by the arrow R2, i.e. with the convex sides 1212 trailing.

The example light mill designs described above all incorporate vanes in which there is asymmetry between the light absorption characteristics of two sides of the vane. However, motion will result from the thermal creep force and (depending on the geometry of the design) the Einstein effect even without this asymmetry, provided a temperature gradient can be established between two sides of a vane so that it is thermally driven.

Thermally driven light mills typically operate in low pressure gases or gas mixtures (such as air) but can generally function in any fluid capable of carrying convection currents.

While the example light mill designs described above each comprise four vanes, any number of vanes can be subject to the light mill effect.

It will also be appreciated that light mills can be driven by other forms of electromagnetic radiation than visible light, for example infrared or ultraviolet radiation could also be used.

Several example designs of optical limiters for limiting the radiant flux of an optical source beam will now be described. Each example limiter comprises an optical input port, an optical output port and an optical control port. The control port is arranged to be illuminated by an optical control beam originating from the source beam. The input port is arranged to be illuminated by an optical transmission beam, also originating from the source beam. The output port is arranged to be illuminated by the transmission beam. In addition, each example limiter comprises a thermally driven light mill arranged such that illumination of the control port by the control beam drives the light mill to rotate only when the control beam has a radiant flux equal to or in excess of a predetermined radiant flux threshold. Rotation of the light mill in turn causes an area of the output port illuminated by the transmission beam to change. In this way, the radiant flux of an output beam emitted through the output port can be limited.

Figure 2A:
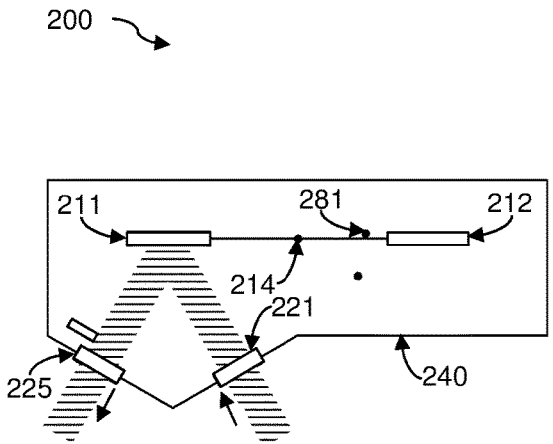
FIG. 2A illustrates an example optical limiter in a first position.
Figure 2B:
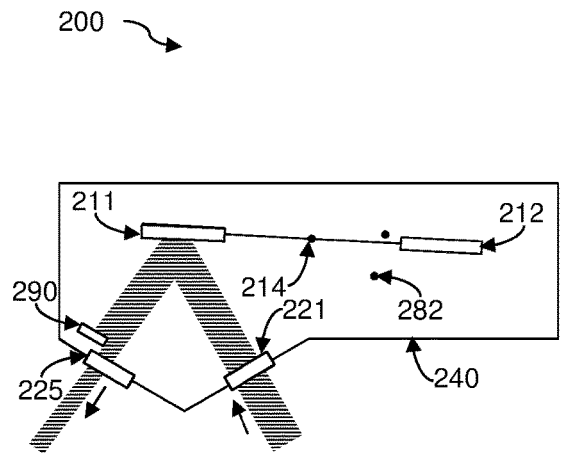
FIG. 2B illustrates the limiter of FIG. 2A in a second position.

FIGS. 2A and 2B illustrate schematic plan views of an example optical limiter 200 comprising a light mill respectively in first and second positions. To avoid cluttering these two figures, reference numerals not relevant to the specific description of each figure are omitted in that figure, though all of the components referred to are present in the limiter 200 as shown in each of the two figures.

The light mill comprises a rigid assembly configured to rotate about an axle 214 on which it is centered. The rigid assembly comprises a first vane 211 rigidly connected to a second vane 212 which acts as a counterweight to the first vane 211. The light mill is located in a sealed housing 240 which keeps the air around the light mill at low pressure, but not entirely evacuated.

A relatively low-power optical beam (such as a laser beam) is indicated in FIG. 2A by relatively broad horizontal hatching. (Both uses of "relatively" in the preceding sentence indicate a comparison to FIG. 2B, which will be described below.) The beam enters the housing 240 through an input port 221 to be incident on the first vane 211. The surface of the first vane 211 on which the beam is incident is partially reflective, so a portion of the beam is reflected off the first vane 211 to be incident on an output port 225. The various components of the limiter 200 are arranged such that all of the reflected portion of the beam is incident on the output port 225 when the light mill is in the position shown in FIG. 2A.

The surface of the first vane 211 on which the beam is incident is configured to absorb some of the electromagnetic radiation carried by the beam (the portion not reflected). That surface is thermally insulated from the surface on the opposite side of the first vane 211 so that a temperature gradient arises from the shaded side to the illuminated side. The light mill effect thus tends to cause the light mill to rotate clockwise so that the illuminated first vane 211 retreats from the beam incident on it. The beam shown in FIG. 2A is however of sufficiently low power that the light mill effect is not sufficient to overcome the light mill's inertia. The light mill therefore remains in its initial position abutting a first stay 281.

The first stay 281 is a post which prevents anticlockwise motion of the light mill beyond the initial position shown in FIG. 2A so that the reflected portion of the beam cannot be misdirected partly or fully to the right of the output port 225, for example in response to external vibrations. It can for example be formed of a material capable of buffering impact forces to reduce wear on both the stay 281 and the portion of the light mill which comes into contact with it.

FIG. 2B shows a relatively high-power optical source beam entering the housing 240 via the input port 221 as indicated by relatively narrow horizontal hatching. (Both uses of "relatively" in the preceding sentence indicate a comparison to FIG. 2A.) In this case, the radiant flux of the beam striking the first vane 211 is high enough to cause a sufficient temperature gradient between the illuminated and shaded sides of the first vane 211 that the light mill effect causes the light mill to rotate clockwise about the axle 214, away from the first stay 281 and towards a second stay 282. Thus the input port 221 acts as a control port for rotation of the light mill, the light beam depicted entering and travelling within the housing 240 being all of a source beam, a transmission beam and a control beam as referred to above.

A biasing element (not shown) in the form of an elastic member attaching the light mill to the housing 240 is provided to slightly bias the light mill towards the position shown in FIG. 2A. (The elastic member could optionally be the axle 214.) This reduces the risk of the light mill rotating clockwise under any influences except for the light mill effect, for example in response to external vibrations. (The biasing element also increases the threshold radiant flux required to start the light mill rotating relative to a light mill whose acceleration is only limited by its own inertia.) Such a biasing element, correctly calibrated, can also be used to control the limiter 200's response. This is because rotation of the light mill will halt at the point that the light mill effect forces are balanced by the biasing force. For example, if the light mill is attached to the housing 240 via an elastic member then an angle by which the light mill is rotated from the position shown in FIG. 2A will be approximately proportional to the input beam power. Such a biasing element can be adjustable; for example the tension of an elastic member could be adjusted by winding or unwinding it from a reel. A suitable biasing element could take other forms than an elastic member, for example a spring or a magnetic apparatus.

With the light mill in the position shown in FIG. 2B, a portion of the beam is still reflected generally towards the output port 225, but at an angle such that only some of the reflected portion of the beam is incident on the output port 225, the remainder being blocked by a beam stopper 290. Therefore, in FIG. 2B, the radiant flux of the output beam exiting the housing 240 via the output port 225 is lower than the radiant flux of the source(/control/transmission) beam entering the housing 240 via the input(/control) port 221. It can be seen that the higher the radiant flux of the beam entering via the input port 221 the more the light mill will turn and thus the lower the area of the output port 225 that will be illuminated. In this way, the mirror provided by the reflective surface of the first vane 211 and the beam stopper 290 together form an optical baffle apparatus arranged to prevent a portion of the beam from illuminating the output port 225, that portion's size being dependent on the angle by which the light mill is rotated.

A second stay 282, similar to the first stay 281, is provided by another post to set a maximum rotation angle for the light mill from the initial position shown in FIG. 2A. This prevents the second vane 212 from rotating so far that it hits the housing 240. The second stay 282's positioning can be chosen to have one of two effects on the response of the limiter 200 to high-power inputs. If the second stay 282 is positioned far enough around the light mill's rotational path that the light mill can rotate far enough that the beam misses the output port 225 altogether then the limiter 200 will act to limit the output power up to a certain input power, then effectively acts as a fuse, causing the output power to drop to zero for all higher input powers. Alternatively, the second stay 282 can be positioned to limit rotation of the light mill more, such that the output radiant flux can be prevented from ever falling to zero if an input signal is present. That is, the second stay 282 can be positioned such that the light mill's clockwise rotation is halted just short of the point where the reflected portion of the beam would entirely miss the output port. (This would however allow the output power to increase beyond the level the limiter is intended to restrict it to, so use of a backup optical fuse in conjunction with a limiter of this type may be advisable if there is a risk of damage to network apparatus from power surges in excess of the limiter level.)

The beam stopper 290 could be omitted from the limiter 200 and, with the light mill in the position shown in FIG. 2B, a portion of the beam would still miss the output port 225, striking the housing 240 adjacent the output port 225 instead. However, the limiter 200's response can be controlled to be flatter by using a dedicated beam stopper 290 than if the housing 240 surrounding the output port 225 is relied upon as part of the baffle apparatus.

Figure 3A:
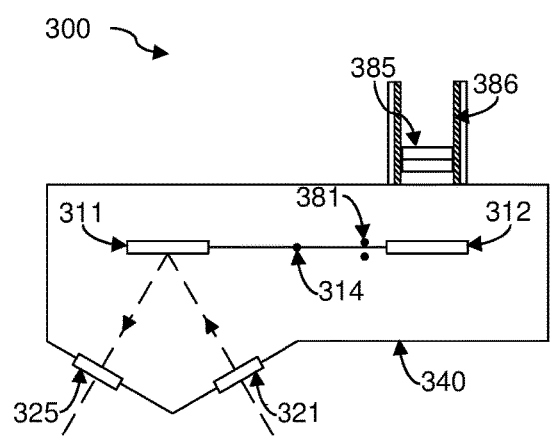
FIG. 3A illustrates an example optical fuse in an "on" position.
Figure 3B:
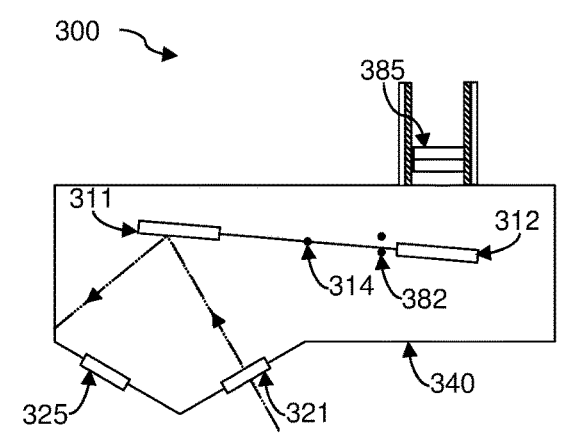
FIG. 3B illustrates the fuse of FIG. 3A in an "off" position.

FIGS. 3A and 3B illustrate schematic plan views of an example optical fuse 300 of a similar design to the optical limiter 200 of FIGS. 2A and 2B. To avoid cluttering these two figures, reference numerals not relevant to the specific description of each figure are omitted in that figure, though all of the components referred to are present in the limiter 300 as shown in each of the two figures. The optical fuse 300 comprises a light mill having a first vane 311 and second vane 312 configured to rotate about an axle 314. The light mill is enclosed in a housing 340 having an input port 321 and an output port 325. The light mill's rotation is constrained by first and second stays 381 and 382. All of these components function in the same way as the corresponding components of the limiter 200 of FIGS. 2A and 2B.

In contrast to the limiter 200 however, the fuse 300 does not comprise the elastic member present in the limiter 200. In addition, the second vane 312 of the fuse 300 is magnetic (for example due to being made of or coated in a layer of iron) and the fuse 300 further comprises a biasing element in the form of a magnet 385. (In the design shown, the magnet 385 is external to the housing 340 for ease of adjustment as will be described below, but it could be within the housing 340 instead.) Magnetic attraction between the magnet 385 and the second vane 312 keeps the light mill abutting the first stay 381 in the position shown in FIG. 3A provided the radiant flux of a beam input through the input port 321 remains below a threshold value.

If the radiant flux of the input beam reaches or exceeds that threshold value then the light mill effect overcomes the magnetic attraction and the light mill (unconstrained by any elastic member) swings suddenly to the position shown in FIG. 3B, abutting the second stay 382, where the reflected portion of the beam misses the output port 325 entirely so that the output power falls sharply to zero.

The light path in FIGS. 3A and 3B is respectively indicated by thin dashed and dot-dashed lines (rather than hatched regions as in FIGS. 2A and 2B) since the sharp response of the fuse at the threshold input power means that the width of the beam is irrelevant. The beam's full width is either transmitted through the output port 325 as shown in FIG. 3A or misses the output port 325 entirely as shown in FIG. 3B. (There is of course an interval as the light mill swings between the positions shown in FIGS. 3A and 3B when the output port 325 is illumination by only a part of the beam, but this interval is extremely brief.)

If and when the source beam is switched off, or its radiant flux falls below the threshold value, the magnet 385 causes the light mill to swiftly rotate back anticlockwise to the position shown in FIG. 3A. The fuse 300 is therefore reusable and self-resetting.

The magnet 385 has an external member so that its position can be adjusted by screwing it closer to or further from the second vane 312 within an internally threaded nut 386. In this way, the threshold power for tripping the fuse can be adjusted. If the nut is sufficiently long the magnet 385 could even be retracted far enough from the second vane 312 that the fuse 300 responds in much the same way as the limiter 200. (In that case, a beam stopper similar to the beam stopper 290 of the limiter 200 could be added to flatten the response as discussed above in relation to FIG. 2B.) Thus the apparatus 300 could in fact be multi-functional; providing an adjustable, reusable, self-resetting optical fuse/limiter.

Figure 3C:
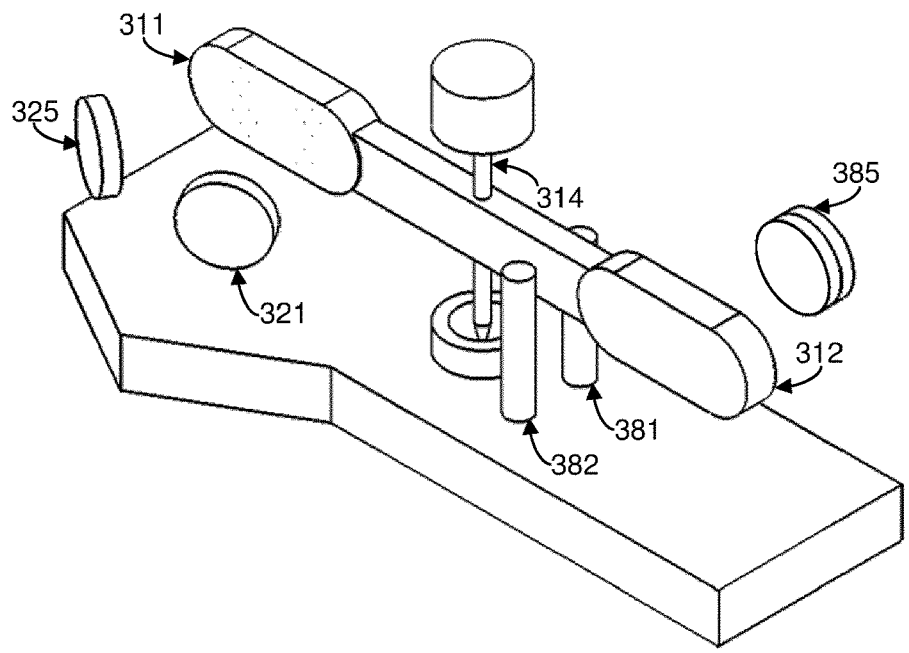
FIG. 3C illustrates some internal components of the fuse of FIG. 3A.

FIG. 3C illustrates the relative positions of the light mill (comprising first and second vanes 311 and 312 configured to rotate about an axle 314), input and output ports 321 and 325, first and second stays 381 and 382 and magnet 385 of the fuse 300 three-dimensionally.

Figure 3D:
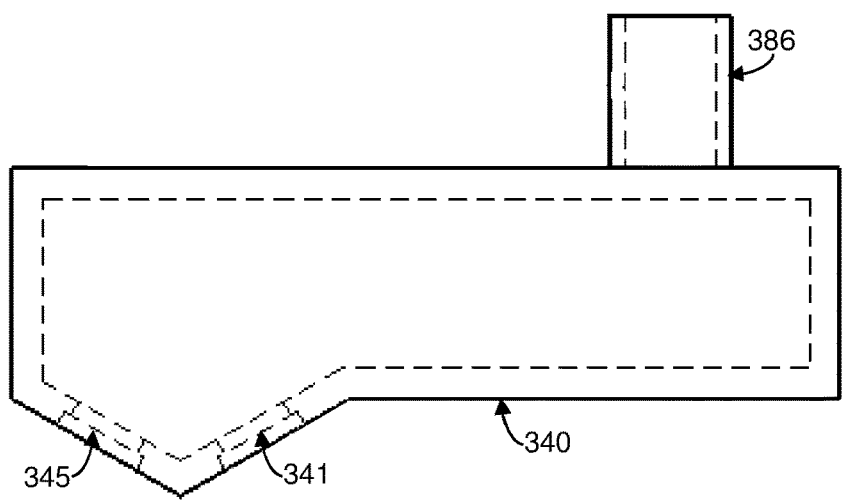
FIG. 3D illustrates some external components of the fuse of FIG. 3A.

FIG. 3D is a plan view of the housing 340 and nut 386 of the fuse 300. The thickness of these components is indicated in phantom using dashed lines for their internal walls. Also shown in phantom are two apertures 341 and 345 in the housing 340, configured to respectively assist in coupling an input optical fiber (not shown) to the input port 321 and an output optical fiber (not shown) to the output port 325. The apertures 341 and 345 have a stepped profile with a relatively narrow internal portion (for example 3 mm in diameter) and a relatively wide external portion (for example 4.6 mm in diameter). The input and output ports 321 and 325 are sealed within the internal portions so that the housing is airtight, allowing the air inside the housing to be kept at an optimal low pressure for operation of the light mill. The external portions are configured to receive optical fibers (not shown) in a snug interference fit.

The housing 240 of the limiter 200 can be identical to the housing 340 of the fuse 300. The housings 240, 340 of the limiter 200 and fuse 300 can for example be approximately 11 mm tall, 7 mm wide and 27 mm long with walls approximately 2 mm thick. They can for example be made of plastic, metal, or another impermeable solid.

In both the limiter 200 and the fuse 300 a further port can be provided in the housing 240, 340 (not shown in any of FIGS. 2A to 3D) for a vacuum apparatus to be attached so that the air pressure inside the housing can be kept at an optimal level for operation of the light mill, for example between 300 and 600 mTor.

The angle between the input and output ports 221, 321 and 225, 325 in the limiter 200 and the fuse 300 can for example be an obtuse angle, e.g. approximately 120°.

The light mills of the limiter 200 and fuse 300 can for example have vanes approximately 1 mm thick and 10 mm long from axle to tip.

The entire limiter/fuse assembly 200, 300 can for example have a mass of approximately 15 g.

The beam stopper 290 of the limiter 200 can for example be approximately 3 mm wide.

Further example limiters and fuses will now be described with reference to FIGS. 4A to 9B. In these figures similar conventions are used to those employed in FIGS. 2A to 3B. That is: (i) to avoid cluttering the figures, not all reference numerals are repeated between multiple views of a particular apparatus; (ii) relatively broad and narrow horizontal hatching is used to indicate relatively low-power and high-power beams in depictions of limiters; and (iii) thin dashed lines are used to indicate relatively low-power beams in depictions of fuses, in contrast to thin dot-dash lines to indicate relatively high-power beams.

FIGS. 4A and 4B illustrate schematic plan views of an example optical limiter 400 comprising a light mill respectively in first and second positions. The limiter 400 functions in a very similar way to the limiter 200 of FIGS. 2A and 2B. It comprises a light mill having a first vane 411 and second vane 412 configured to rotate about an axle 414. The light mill is biased towards the position shown in FIG. 4A by virtue of being attached to the housing 440 by an elastic member (not shown). The light mill is enclosed in a housing 440 having an input port 421 and an output port 425. The light mill's rotation is constrained by first and second stays 481 and 482. A beam stopper 490 is also provided. All of these components function in the same way as the corresponding components of the limiter 200 of FIGS. 2A and 2B, the only difference being the geometry of their arrangement. Specifically, the input port 421 is perpendicular to the output port 425 in this limiter 400, as opposed to the input port 421 being at an obtuse angle to the output port 425 in the limiter 200.

FIGS. 5A and 5B illustrate schematic plan views of an example optical fuse 500 of a similar design to the optical limiter 400 of FIGS. 4A and 4B. The optical fuse 500 comprises a light mill having a first vane 511 and second vane 512 configured to rotate about an axle 514. The light mill is enclosed in a housing 540 having an input port 521 and an output port 525. The light mill's rotation is constrained by first and second stays 581 and 582. All of these components are identical to the corresponding components of the limiter 400 of FIGS. 4A and 4B.

In contrast to the limiter 400 however, in the fuse 500 there is no elastic member, the second vane 512 is magnetic and the fuse 500 further comprises a biasing element in the form of a magnet 585. The magnet 585 functions in a similar way to the magnet 385 of FIGS. 3A to 3C, only it is located within the housing 540 and is not adjustable. The fuse 500 thus has a fixed threshold input power value which will cause it to trip and cannot be made to function as a limiter. Like the fuse 300 however, the fuse 500 is reusable and self-resetting.

FIGS. 6A and 6B illustrate schematic plan views of another example optical limiter 600 comprising a light mill respectively in first and second positions. The limiter 600 functions in a similar way to the limiter 400 of FIGS. 4A and 4B. It comprises a light mill enclosed in a housing 640 having an input port 621 and an output port 625. The light mill is attached to the housing 640 via an elastic member (not shown) which biases it towards the position shown in FIG. 6A. A beam stopper 690 is provided, which functions in the same way to the beam stopper 490 of the limiter 400.

The limiter 600 however differs from the limiter 400 of FIGS. 4A and 4B in that control of the light mill's rotation and direction of light from the input port 621 towards the output port 625 are provided separately, rather than both being provided by a first vane of the light mill as in the limiter 400. As shown in FIGS. 6A and 6B, a source beam arriving from the left-hand side encounters an optical splitter 661 which splits the source beam into a control beam and a transmission beam.

The control beam is directed to a mirror 671 which routes it on through a control port 631 to be incident on a first vane 611 of the light mill. The first vane 611 absorbs some or all of the energy of the control beam. Where the source beam is relatively powerful, as shown in FIG. 6B, the control beam is sufficiently powerful to cause the light mill to rotate clockwise due to the light mill effect induced by this absorption.

The transmission beam continues on through the splitter 661 and the input port 621 to be incident centrally on a light director 613 such as a mirror. The light director 613 is part of the rigid assembly of the light mill, centered on the axle 614 and configured to turn with the first and second vanes 611 and 612 about the axle 614. The transmission beam is reflected by the light director at an angle dependent on the rotational position of the light mill. With the light mill in the position shown in FIG. 6A, the transmission beam is incident centrally on the output port 625 so that the power of the output beam is maximized. With the light mill in the position shown in FIG. 6B, part of the transmission beam is blocked by the beam stopper 690 so the power of the output beam is reduced. In this way, the light director 613 and the beam stopper 690 together form an optical baffle apparatus arranged to prevent a portion of the transmission beam from illuminating the output port 625, that portion's size being dependent on the angle by which the light mill is rotated.

Any anticlockwise rotation of the light mill which may be caused by influences other than the light mill effect, such as external vibrations, is constrained by a first stay 681. Clockwise rotation of the light mill is constrained by a pair of second stays 682. One of the pair of second stays 682 could be omitted, though including both balances the forces on the two sides of the light mill when it is abutting them, reducing the risk of it bending or snapping. As explained above in relation to FIG. 2B, the positioning of the second stays 682 determines the response of the limiter 600 to high-power source beams.

FIGS. 7A and 7B illustrate schematic plan views of an example optical fuse 700 of a similar design to the optical limiter 600 of FIGS. 6A and 6B. The optical fuse 700 comprises a light mill having a first vane 711, a second vane 712 and a light director 713 rigidly connected between them. All of the first and second vanes 711, 712 and the light director 713 are configured to rotate together about an axle 714. The light mill is enclosed in a housing 740 having an input port 721, an output port 725 and a control port 731. The light mill is attached to the housing 740 via an elastic member (not shown) which biases it towards the position shown in FIG. 7A. A splitter 761 is configured to split a source beam into a transmission beam incident on the input port 721 and a control beam incident on the control port 731, via reflection by a mirror 771. The light mill's rotation is constrained by a first stay 781 and a pair of second stays 782. All of these components function in the same way as the corresponding components of the limiter 600 of FIGS. 6A and 6B.

In contrast to the limiter 600 however, in the fuse 700 there is no elastic member, the second vane 712 is magnetic and the fuse 700 further comprises a biasing element in the form of a magnet 785. The magnet 785 functions in the same way as the magnet 585 of the fuse 500.

FIGS. 8A and 8B illustrate schematic plan views of another example optical limiter 800 comprising a light mill respectively in first and second positions. The limiter 800 functions in a similar way to the limiter 600 of FIGS. 6A and 6B. It comprises a light mill enclosed in a housing 840 having an input port 821, an output port 825 and a control port 831. The light mill is attached to the housing 840 via an elastic member (not shown) which biases it towards the position shown in FIG. 8A. A splitter 861 is configured to split a source beam into a transmission beam incident on the input port 821 and a control beam incident on the control port 831, via reflection by a mirror 871, just like in the limiter 600 of FIGS. 6A and 6B. The light mill's clockwise rotation is constrained by a pair of stays 882 corresponding to the pair of second stays 682 of the limiter 600.

The limiter 800 however differs from the limiter 600 of FIGS. 6A and 6B in that the light mill of the limiter 800 does not comprise a light director. The limiter 800 has an optical baffle apparatus comprising two beam stoppers 891 and 892 defining the limits of an aperture. (The optical baffle apparatus could alternatively be provided by a single ring-shaped beam stopper which would look identical when cross-sectioned through the level of the aperture.) The beam stoppers 891 and 892 are rigidly connected between the first and second vanes 811 and 812 and are configured to turn along with them about an axle which is not shown (since it is attached to the depicted components of the light mill above and/or below the level of the aperture). The output port 825 is parallel to and coaxial with the input port 821. When the light mill is in the position shown in FIG. 8A, the aperture between the beam stoppers 891 and 892 is intermediate and coaxial with the input port 821 and output port 825 so that the power of the output beam is maximized. As shown in FIG. 8B, as the light mill rotates from the position shown in FIG. 8A to the position shown in FIG. 8B an increasing area of the transmission beam is blocked by the beam stoppers 891 and 892 so that the power of the output beam is reduced.

No stay is depicted to hold the light mill in the initial position shown in FIG. 8A against influences other than the light mill effect, such as external vibrations, though one could be provided. For example, one or both of the first and second vanes 811 and 812 and/or the spokes on which they are mounted could be configured to be weakly attracted to one or more magnets in corresponding locations on the base and/or roof of the housing 840. Alternatively, the elastic member could be sufficient to perform this function.

FIGS. 9A and 9B illustrate schematic plan views of an example optical fuse 900 of a similar design to the optical limiter 800 of FIGS. 8A and 8B. The optical fuse 900 comprises a light mill having a first vane 911, a second vane 912 and two beam stoppers 991 and 992, defining an aperture, rigidly connected between the first and second vanes 911 and 912. All of the first and second vanes 911, 912 and the first and second beam stoppers 991, 992 are configured to rotate together about an axle (not shown). The light mill is enclosed in a housing 940 having an input port 921, an output port 925 and a control port 931. A splitter 961 is configured to split a source beam into a transmission beam incident on the input port 921 and a control beam incident on the control port 931, via reflection by a mirror 971. All of these components are identical to the corresponding components of the limiter 800 of FIGS. 8A and 8B.

In contrast to the limiter 800 however, in the fuse 900 there is no elastic member, the second vane 912 is magnetic and the fuse 900 further comprises a biasing element in the form of a magnet 985. The magnet 985 functions in the same way as the magnet 785 of the fuse 700.

The fuse 900 also comprises first and second stays 981 and 982 to respectively constrain anticlockwise and clockwise rotation of the light mill in a similar manner to the first and second stays 581 and 582 of the fuse 500 of FIGS. 5A and 5B.

In all of the example limiters and fuses described above, at least one region of at least one face of at least one vane of each light mill is configured to have light incident upon it, and to absorb energy from that light so that it heats up relative to an opposing region of an opposing face of that vane. The absorbing region can for example be coated with graphite, black aluminum foil, anodized aluminum or Litho-Black™. Provided the opposing regions are thermally insulated from one another and the absorbing region is illuminated to a greater extent than the opposing region, there is no need for there to be any asymmetry in their optical absorptance. (Optical absorptance is defined as the ratio of absorbed to incident radiant power.) The illuminating light being a laser beam sufficiently narrow with respect to the size of the vane that only one side of the vane is targeted enhances the effect. However, the light mill effect can be enhanced by providing the absorbing region with a higher optical absorptance than the opposing region. For example, the opposing region can be covered with a reflective metal, such as silver, or a dielectric material. Alternatively or additionally, the absorbing region can be shaped such that it receives a greater quantity of radiant flux than the opposing region over a permitted range of rotation of the light mill, making use of the principle described in relation to FIG. 1C above.

The light mills of all of the example fuses and limiters described above comprise two vanes; a first vane configured to be struck by a control beam and a second vane which acts as a counterweight. The second vane could be omitted, and the light mills would still rotate in response to the control beams. Alternatively, the light mills could be provided with more than two vanes.

Some of the example limiters and fuses described above comprise one or more light directors such as mirrors. Such a mirror can be provided by a surface which is at least partially reflective. If a mirror needs to be capable of absorbing some light, for example in the example switches and limiters 200, 300, 400 and 500 described above in relation to FIGS. 2A to 5B, its surface can for example be made partially reflective by layering a thin dielectric over a light absorbent surface (e.g. a surface coated with a light-absorbent material as described above). Other optical components, such as prisms, could alternatively be employed as light directors.

In all of the example limiters and fuses described above, at least one component of an optical baffle apparatus is arranged to rotate with the light mill. However, other arrangements could be envisaged wherein motion of the light mill causes redirection or blocking of the transmission beam in some other way. For example, a cam arrangement could be used to translate the rotational motion of a light mill into linear motion of a light director.

In all of the example limiters and fuses described above, motion of the light mill is constrained by stays in the form of buffer/bumper/rest elements provided for one or more of the light mill vanes (and/or spokes on which they are carried) to but up against. Alternatively, a single stay could be provided for multiple vanes, e.g. so that in a two-vane example the light mill rotates almost a full circle between its two positions.

Other forms of stay could also be used; any element that prevents or impedes rotation beyond a certain position in one direction, while allowing (some) counter-rotation away from that position, would be suitable. For example other kinds of mechanical stays, such as catches, could be envisaged, in addition to magnetic stays such as those described above. The optical transmission (input/output) and control ports used in limiters and fuses according to the present disclosure can be used to couple light from/to optical fibers. They can optionally comprise lenses to focus or defocus that light as appropriate.

Other embodiments will be apparent to those skilled in the art from consideration of the specification and practice of the embodiments disclosed herein. It is intended that the specification and examples be considered as exemplary only. In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The invention claimed is:

1. An optical limiter for limiting radiant flux of an optical source beam, the optical limiter comprising:
   an optical control port for illumination by an optical control beam originating from the optical source beam, an optical input port for illumination by an optical transmission beam originating from the optical source beam, and an optical output port for illumination by the optical transmission beam, wherein the optical control port can be the optical input port, the optical input port can be the optical control port, and the optical control port, the optical input port, and the optical output port can be distinct, and wherein the optical source beam can serve as both the optical transmission beam and the optical control beam; and
   a thermally driven light mill,
   wherein the thermally driven light mill is arranged with respect to the optical input port, the optical control port, and the optical output port, such that:
      illumination of the optical control port by the optical control beam drives the thermally driven light mill to rotate only when the optical control beam has a radiant flux equal to or in excess of a predetermined radiant flux threshold; and
      rotation of the thermally driven light mill causes an area of the optical output port illuminated by the optical transmission beam to change.

2. The optical limiter of claim 1, further configured to permit rotation of the thermally driven light mill by an angle large enough that the area of the optical output port illuminated by the optical transmission beam is zero, such that the optical limiter acts as a reusable optical fuse.

3. The optical limiter of claim 1, further configured to limit the radiant flux of an optical source beam originating from a laser.

4. The optical limiter of claim 1, wherein at least one of:
   a side of a vane of the thermally driven light mill arranged to be illuminated by the optical control beam in use has a higher optical absorptance than an optical absorptance of an opposing side of the vane; or
   a side of the vane of the thermally driven light mill arranged to be illuminated by the optical control beam and the opposing side of the vane are shaped such that, over a permitted range of rotation of the thermally driven light mill, the side of the vane illuminated by the optical control beam receives a greater quantity of radiant energy from the optical control beam than the opposing side.

5. The optical limiter of claim 1, further comprising an optical baffle apparatus arranged to prevent a portion of the optical transmission beam from illuminating the optical output port, the size of the portion being dependent on an angle by which the thermally driven light mill is rotated.

6. The optical limiter of claim 5, wherein the optical baffle apparatus comprises at least one of:
   one or more light directors; or
   one or more beam stoppers.

7. The optical limiter of claim 5, wherein:
   the optical input port and the optical output port are coaxial with one another;

the optical baffle apparatus comprises one or more beam stoppers arranged to rotate with the thermally driven light mill; and the one or more beam stoppers are arranged to define an aperture that the optical transmission beam must pass through to reach the optical output port.

8. The optical limiter of claim 1, wherein the optical input port is the optical control port, with the optical source beam serving, as both the optical transmission beam and the optical control beam.

9. The optical limiter of claim 1, further comprising an optical splitter arranged to split the optical source beam into the optical transmission beam and the optical control beam.

10. The optical limiter of claim 1, further comprising a biasing element wherein the thermally driven light mill is coupled to the biasing element such that the thermally driven light mill is biased towards a first rotational position in which the area of the optical output port illuminated by the optical transmission beam is maximized relative to any other rotational position of the thermally driven light mill.

11. The optical limiter of claim 10, wherein the biasing element is configured to be adjustable so that a biasing force exerted by the biasing element on the thermally driven light mill can be modified.

12. The optical limiter of either of claim 10, further configured to permit rotation of the thermally driven light mill by an angle large enough that the area of the optical output port illuminated by the optical transmission beam is zero, such that the optical limiter acts as a reusable optical fuse, and wherein the biasing element is configured to:

when the radiant flux of the optical source beam is below the predetermined radiant flux threshold, prevent rotation of the thermally driven light mill away from the first rotational position; and when the radiant flux of the optical source beam equals or exceeds the predetermined radiant flux threshold, permit rotation of the thermally driven light mill from the first rotational position by the angle large enough that the area of the optical output port illuminated by the optical transmission beam is zero.

13. The optical limiter of claim 1, further comprising one or more stays each arranged to prevent rotation of the thermally driven light mill beyond a particular rotational position.

14. The optical limiter of claim 1, further comprising a housing which encloses the thermally driven light mill, the housing comprising an aperture configured for partial evacuation of fluid surrounding the thermally driven light mill.

15. A method of limiting radiant flux of an optical source beam, the method comprising:

illuminating the optical input port of the optical limiter of claim 1 with an optical transmission beam originating from the optical source beam; and illuminating the optical control port of the optical limiter with an optical control beam originating from the optical source beam.

* * * * *